(12) United States Patent
Ng et al.

(10) Patent No.: US 12,493,306 B2
(45) Date of Patent: Dec. 9, 2025

(54) NANOMETER MANUFACTURED ARTIFICIAL INTELLIGENCE FLOW CONTROL LIQUID-TO-GAS CONVERSION METHOD

(71) Applicants: Charles H Ng, Palo Alto, CA (US); HokChung Ng, Toronto (CA)

(72) Inventors: Charles H Ng, Palo Alto, CA (US); HokChung Ng, Toronto (CA)

(*) Notice: Subject to any disclaimer, the term of this patent is extended or adjusted under 35 U.S.C. 154(b) by 253 days.

(21) Appl. No.: 18/221,224

(22) Filed: Jul. 12, 2023

(65) Prior Publication Data

US 2024/0152164 A1 May 9, 2024

Related U.S. Application Data

(60) Provisional application No. 63/424,118, filed on Nov. 9, 2022.

(51) Int. Cl.
*G05D 7/06* (2006.01)
*C25B 1/04* (2021.01)

(52) U.S. Cl.
CPC ............ *G05D 7/0694* (2013.01); *C25B 1/04* (2013.01)

(58) Field of Classification Search
CPC ....................................................... C25B 1/04
See application file for complete search history.

(56) References Cited

U.S. PATENT DOCUMENTS

2002/0100681 A1* 8/2002 Kirk .................. C25B 9/73
204/290.01

* cited by examiner

*Primary Examiner* — Hosung Chung

(57) ABSTRACT

Electron exchangers are placed in the conversion cell and divide it into cathode gas chamber, liquid conversion solution chamber together with a liquid flow distributor, and anode gas chamber. Voltage is applied to the electron exchangers to convert the liquid conversion solution to gases, and gases are released directly to the gas chambers. There are many puncture channels on the surfaces of the liquid flow distributor, and they are designed by critical surface calculations. The puncture channels have special designed patterns and are manufactured with a precision technology. A microprocessor connected to the cloud is responsible for artificial intelligence calculations, and it controls liquid and gas flow valves in the conversion cell. In producing the same amount of final gases, our method is energy efficient.

21 Claims, 4 Drawing Sheets

NANOMETER MANUFACTURED ARTIFICIAL INTELLIGENCE FLOW CONTROL LIQUID-TO-GAS CONVERSION METHOD

CROSS-REFERENCE TO RELATED APPLICATIONS

This application claims the benefit of Provisional Patent Application Ser. 63/424,118 filed Nov. 9, 2022 by the present inventors, which is incorporated by reference in its entirety.

TECHNICAL FIELD

The present invention relates to liquid to gas conversion method with an electrical voltage, specifically to such a method which is energy efficient.

BACKGROUND ART

It is known in the prior art that liquid-to-gas conversion is commonly achieved by the application of a voltage to a liquid conversion solution through two pieces of conductive materials to produce final gases. With two pieces of conductive materials immersed in the liquid conversion solution, as anode and cathode, the conductive materials are under direct contact with the liquid conversion solution. Electrons are exchanged between these conductive materials and the liquid conversion solution, and final gases are released as bubbles from the immersed conductive materials. The gases float upward from the liquid conversion solution to the gas chambers above. This prior process is generally not energy efficient.

SUMMARY

Our method provides an energy efficient liquid-to-gas conversion using nanometer-manufactured artificial intelligence flow control conversion cell.

DRAWINGS

Figures

Figure 1:
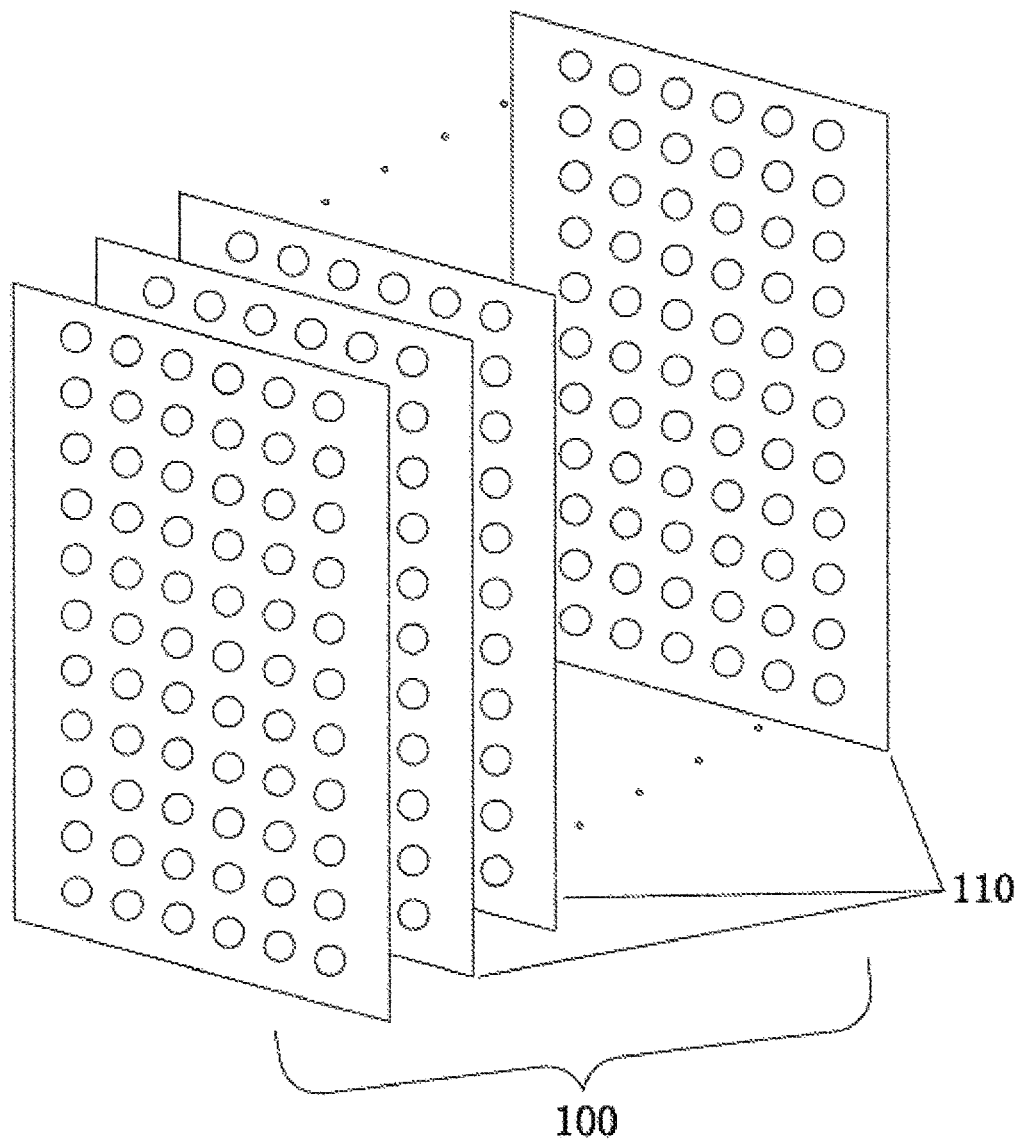
Figure 2:
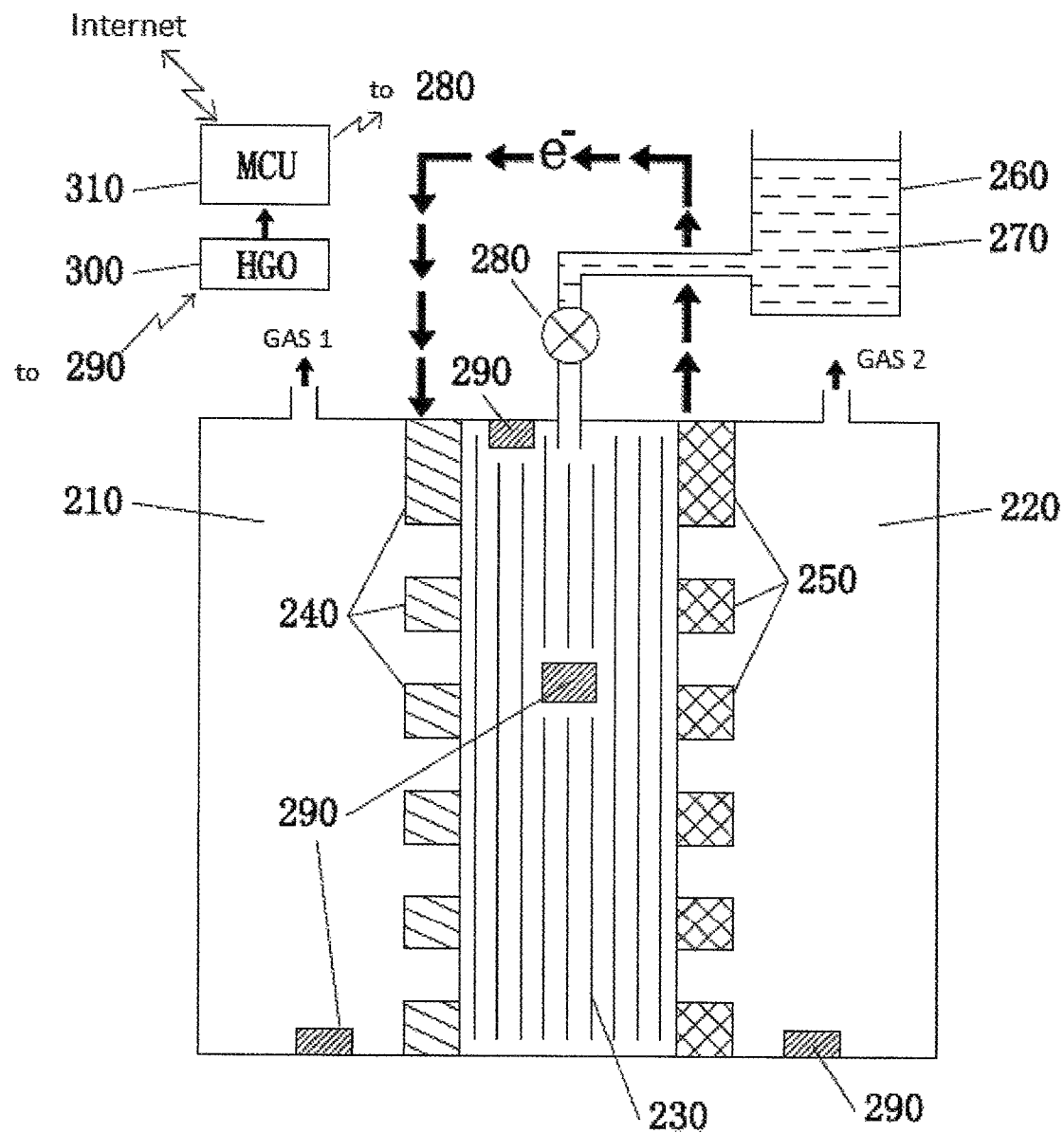
Figure 3:
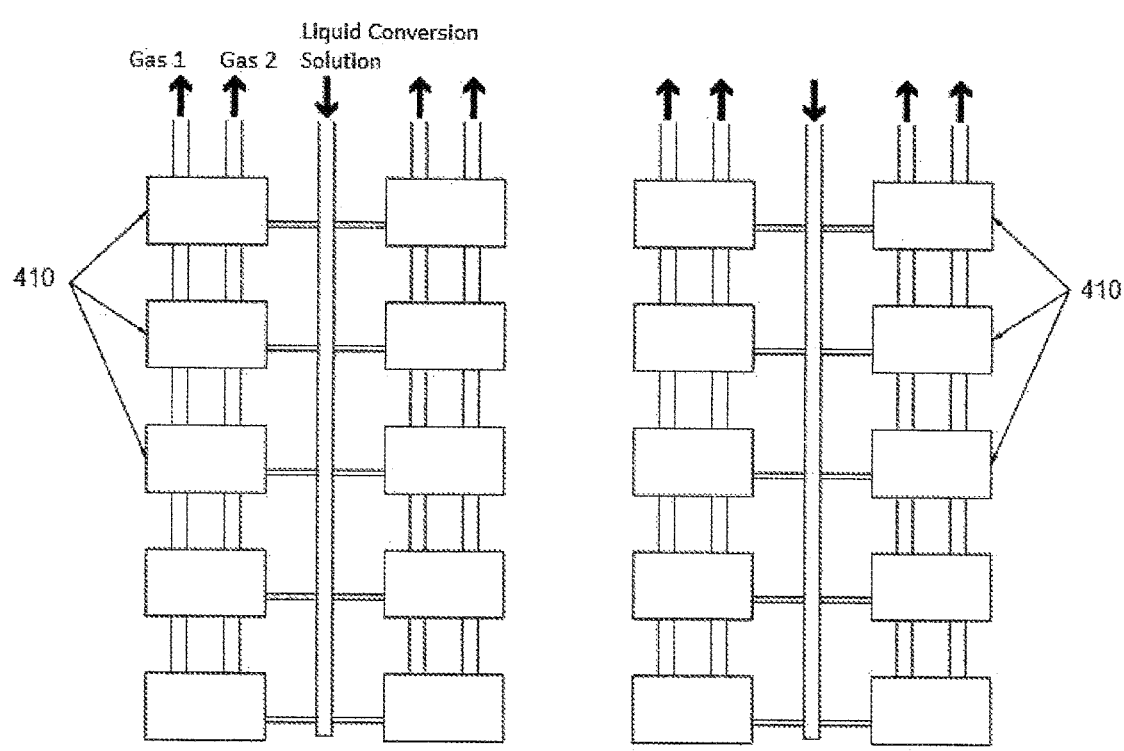

1) FIG. 1: Liquid flow distributor built by stacking multiple flow distributor sheets to distribute the flow of liquid conversion solution
2) FIG. 2: Liquid-to-gas conversion cell with electron exchangers and liquid flow distributor.
3) FIG. 3: Stacking of conversion cells horizontally and vertically
4) FIG. 4: Y, X, and star patterns for puncture channels

REFERENCE NUMERALS

100: Liquid flow distributor
110: Flow distributor sheets
210: Cathode gas chamber
220: Anode gas chamber
230: Liquid conversion solution chamber with the liquid flow distributor
240: Cathode electron exchanger
250: Anode electron exchanger
260: Liquid reservoir
270: Liquid conversion solution
280: Liquid flow valve
290: Liquid content sensor
300: Hygrometer (HGO)
310: Microprocessor (MCU)
410: Liquid-to-gas conversion cell

Description

Our method discloses a nanometer manufactured artificial intelligence flow control liquid-to-gas conversion method.

The anode electron exchanger 250 and the cathode electron exchanger 240 in the liquid-to-gas conversion cell are placed in the conversion cell (FIG. 2), and the conversion cell is divided, from one side to the other side, into the cathode gas chamber 210, the cathode electron exchanger, the liquid conversion solution chamber filled with the liquid flow distributor 230, the anode electron exchanger, and the anode gas chamber 220 (FIG. 1). The liquid flow distributor 100 is composed of multiple nonconductive flow distributor sheets 110 stacked together The nonconductive sides of the electron exchangers facing the liquid conversion solution chamber are in direct contact with the liquid flow distributor. The other sides of the electron exchangers facing the gas chambers are conductive. The surfaces of the electron exchangers are covered with multiple puncture channels.

Liquid conversion solution 270 is fed into the liquid flow distributor inside the liquid conversion solution chamber from the liquid reservoir 260, and voltage is applied to the anode electron exchanger and the cathode electron exchanger. Liquid conversion solution passes through the puncture channels of the electron exchangers from the liquid flow distributor to the conductive sides of the electron exchangers. Electrons are exchanged on the conductive sides of electron exchangers facing the gas chambers, and the liquid conversion solution is converted into final gases, releasing separately into the cathode gas chamber and the anode gas chamber.

A liquid flow valve 280 is placed at liquid inlet of the liquid flow distributor to distribute the flow of liquid conversion solution from the liquid reservoir to the liquid flow distributor. Solvent is added to the liquid conversion solution to ionize the molecules of the liquid conversion solution. The working temperature of the conversion cell is adjusted to approximately close to normal room temperature, and the operating pressure inside the different chambers of the conversion cell is adjusted to approximately close to normal sea level atmospheric pressure. Gas flow valves are placed at the gas outlets of cathode and anode gas chambers. By using artificial intelligence calculations, a microprocessor controls the liquid flow valve and the gas flow valves to adjust the working temperature, liquid pressure, and gas pressure in different chambers of the conversion cell to improve the gas production level and the energy efficiency of the conversion cell.

Figure 4:
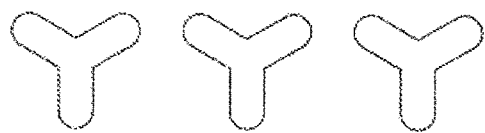
Figure 4:
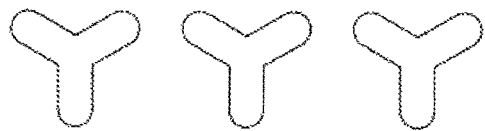
Figure 4:
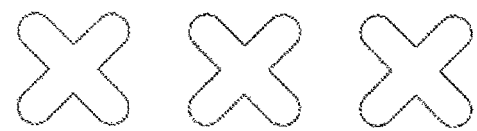
Figure 4:
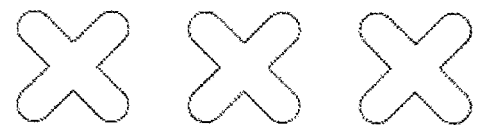
Figure 4:
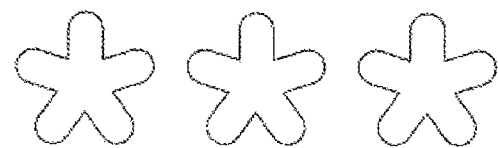
Figure 4:
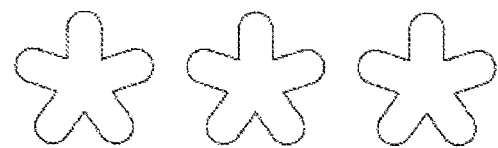

Multiple nonconductive flow distributor for sheets are stacked together to form the liquid flow distributor, and the number of flow distributor sheets ranges from 2 to 10,000 sheets or more. There are multiple puncture channels on the surface of the flow distributor sheet. The sizes of the puncture channels are designed by critical surface calculations. Also, the puncture channels of the electron exchangers are designed and manufactured in a similar way as the puncture channels of the flow distributor sheets. The puncture channels distribute at the rate and amount of the liquid conversion solution in passing through the flow distributor sheets. The puncture channels have special designed Y-shaped, X-shaped, and star-shaped patterns (FIG. 4). The patterns enhance the ability of liquid conversion solution to adhere to the surfaces of the flow distributor sheets;

When the flow distributor sheets are stacked together, the puncture channels from adjacent flow distributor sheets are kept out of alignment with each other. In other words, the puncture channels from distributor sheets are located at different positions from each other, and they are separated to form a pattern of interlocking puncture channels. These interlocking puncture channels enhance the ability of liquid conversion solution to adhere to the surfaces of the flow distributor sheets.

The flow distributor sheets are manufactured by a precision technology selected from a list of options comprising: chemical etching, plasma etching, laser drilling or electroforming. The first option of chemical etching process is applied to a piece of conductive material to etch away specific points of the material to form the puncture channels. As the second option, it is also possible to apply plasma etch on a nonconductive polymer material to etch away specific spots of the nonconductive polymer material to form the puncture channels. The third option is laser drilling, in which a piece of conductive or nonconductive material that meets the requirements is repeatedly applied with pulsing focused laser energy to cut through the material to form the puncture channels. A fourth option is electroforming, where nanometer scale or micrometer scale metal devices are fabricated by electrodepositing on a pattern called a mandrel. The desired conductive material is electrodeposited on the mandrel to form the flow distributor sheet and the puncture channels. If the making of the flow distributor sheet starts from a conductive material, after the puncture channels are made by one of the above processes, the surface of the conductive material is coated with a nonconductive polymer material to make the flow distributor sheet nonconductive on one side.

The design of the liquid flow distributor, the flow distributor sheet, and the puncture channels is the key to distribute the liquid conversion solution to adhere to the flow distributor sheets, and to make the liquid conversion solution form thin films on the flow distributor sheets. The thickness of the flow distributor sheets, the spacing between adjacent flow distributor sheets, the size of the puncture channels, and the distance separating the puncture channels should not be too large or too small, in the range of nanometers to micrometers, and should be calculated by the following method.

The liquid conversion solution stays on the critical surface of the flow distributor sheet as droplets. It will diffuse until a partial wetting equilibrium contact radius is reached. For a simple estimation calculations, the droplet radius r can be expressed as:

$$r = \sqrt{\frac{V}{\pi h}}, \text{ where } h = \sqrt{\frac{2\sigma(1-\cos\theta)}{\rho g}},$$

π is the surface tension
g is the gravitational acceleration constant
θ is the contact angle between the liquid and the surface
h is the height of the droplet
V is the time function of the volume of the droplet Using a more detailed model and calculations, the change in droplet radius over time r(t) can be expressed as:

$$r(t) = r_e \left[ 1 - \exp\left( -\left( \frac{2\gamma_{LG}}{r_e^{12}} + \frac{\rho g}{9 r_e^{10}} \right) \frac{24\lambda V^4(t+t_0)}{\pi^2 \eta} \right) \right]^{\frac{1}{6}};$$

It is also possible to assume perfect spreading of the liquid conversion molecules and radius over time r(t) can be expressed as:

$$r(t) = \left[ \left( \gamma_{LG} \frac{96\lambda V^4}{\pi^2 \eta}(t+t_0) \right)^{\frac{1}{2}} + \left( \frac{\lambda(t+t_0)}{\eta} \right)^{\frac{2}{3}} \frac{24\rho g V^{\frac{3}{8}}}{7 \cdot 96^{\frac{1}{3}} \pi^{\frac{4}{3}} \gamma_{LG}^{\frac{1}{3}}} \right]^{\frac{1}{6}},$$

γLG is the surface tension of the liquid
V is the droplet volume
η is the viscosity of the liquid
ρ is the density of the liquid
g is the gravitational acceleration constant
λ is the shape factor, 37.1 m-1
t0 is the experimental delay time
re is the radius of the droplet at equilibrium Assuming the delay time is approximately 0.1 to 2 seconds to calculate the droplet radius, the spacing between adjacent puncture channels of flow distributor sheets should be set as approximately 100% to 200% of the droplet radius over time r(t).

The radii of the puncture channels of flow distributor sheets should be set approximately no larger than the radius over time r(t). In common liquid conversion solution materials, the diameters of the puncture channels can be approximately 100 nanometers to 100 micrometers. The spacing and the radii of the puncture channels can be adjusted based on the operating temperature, liquid pressure, gas pressure, and the desired gas production level.

On the same flow distributor sheet, the size and the spacing of the puncture channels can be smaller or larger depending on their distances away from the source of the liquid conversion solution flowing into the flow distributor sheet.

The thickness of the flow distributor sheet and the distance between adjacent flow distributor sheets can be calculated in the following:

The height h of a liquid column is given as $$h = \frac{2\gamma\cos\theta}{\rho \text{gr}},$$

γ is the liquid-air surface tension coefficient (force/unit length),

Θ is the contact angle,

ρ is the density of liquid, g is the gravitational acceleration constant, and r is the radius over time r(t).

The thickness of the puncture channels of the flow distributor sheet should be as approximately no thicker than h. The thickness of the sheet is approximately 100 nanometers to 100 microns in common liquid conversion solution materials.

The liquid flow distributor is formed by stacking multiple flow distributor sheets, and the spacing between adjacent flow distributor sheets should not be greater than approximately 50% to 100% of h. In common liquid conversion solution materials, the spacing between adjacent flow distributor sheets is approximately between 50 nanometers and 100 microns. The thickness and the spacing of the flow distributor sheet can be adjusted according to the operating temperature, liquid pressure, gas pressure, and the desired gas production level.

The conversion cell is equipped with an intelligent microprocessor (MCU) 310 responsible for the artificial intelligence machine learning calculations. The liquid flow valve is placed at liquid inlet of the liquid flow stroller distributor. The microprocessor controls the liquid flow valve and decides whether to open or close the valve, increase or slow the flow of the liquid conversion solution from the liquid reservoir to the liquid flow distributor.

The microprocessor is connected to the hygrometer 300 with four liquid content sensors 290 inside the conversion cell, and more liquid content sensors can be placed at selected locations of the conversion cell. Each sensor has a pair of resistance probes to sense the liquid content of the liquid conversion solution at different locations in the conversion cell. The probes are made of anti-corrosion and anti-oxidation conductive materials, or they can be coated with highly conductive anti-corrosion and anti-oxidation materials to prevent the probe from oxidation over time.

The first liquid content sensor is placed at the liquid inlet side of the liquid flow distributor, and the second liquid content sensor is placed near the middle area of the liquid flow distributor in order to detect the liquid content of the liquid conversion solution in these locations. If the microprocessor senses the lack of liquid conversion solution at these sensor locations, the microprocessor opens the liquid flow valve to let more liquid conversion solution flow from the liquid reservoir to the liquid flow distributor. When the microprocessor senses enough liquid conversion solution at these sensor locations, the microprocessor closes the liquid flow valve and slow the flow of liquid conversion solution from the liquid reservoir.

The third and fourth liquid content sensors are placed at the bottom of the cathode gas chamber, and the bottom of the anode gas chamber. If the microprocessor senses certain amount of liquid conversion solution at these locations because there is too much liquid conversion solution entering the liquid flow distributor, and the electron exchanger cannot keep up with the liquid-to-gas conversion. The microprocessor turns off the liquid flow valve to slow the liquid conversion solution flow to the liquid flow distributor, and let the electron exchanger catch up with the liquid-to-gas conversion.

The microprocessor is connected to and exchange data with temperature sensors, liquid pressure sensors, and gas pressure sensors placed inside the anode gas chamber, cathode gas chambers, liquid conversion solution chamber, or next to these chambers of the conversion cell. The microprocessor is connected to two gas flow sensors placed at the gas outlets of the cathode and the anode gas chambers. The microprocessor adjusts the liquid flow valve and the gas flow valves, affecting the working temperature, liquid pressure, and the gas pressure inside or next to the various chambers of the conversion cell, and affecting the gas output level at the gas outlets of the gas chambers. The microprocessor's control action improves the gas production level and the energy efficiency of the conversion cell.

The microprocessor transmits the data to the cloud computing engine through the Internet to perform the artificial intelligence calculations and store the data in the cloud storage. Due to security concerns, these data can also be transmitted to the local computing engine through wired or wireless network, and the artificial intelligence calculations can be completed in the local microprocessor and local computing engine.

The combined use of microprocessor, local computing engine, and cloud computing engine calculates the control instructions from the analysis results, and transmits the control instructions to control the liquid flow valve, gas flow valves, and the sensors. At the same time, human operators can read the data and the artificial intelligence calculations results through wired or wireless networks from mobile phones and computer devices.

Machine learning is specifically a predictive modeling technique, and the main objective is to minimize the error of the model, and to make the most accurate prediction possible. Machine learning algorithms are described as learning target predictive function that can be used to predict output data based on future input data. Through the training of a large amount of previous data, the machine learning model continues to learn and improve its accuracy in predicting the output data from future new input data.

Machine learning algorithm is described as learning an objective prediction function (F) that best maps an input variable (X) to an output variable (Y), in other words, predicts an output (Y) based on an input (X).

$$Y=F(X)$$

Regression analysis is used for the artificial intelligence machine learning calculations and it can use a combination of 1) single variable regression, 2) multi variable regression, 3) linear regression, and 4) nonlinear regression.

For illustration, an example will be shown using a multi variable linear regression function with predictive function F (X) for the machine learning calculations, and the same principle can be applied to use different combinations of single variable regression, multiple variable regression, linear regression and nonlinear regression for the machine learning calculations.

When building and training the model, the regression function F (X) is described as follows:

$$Y=F(X)$$

$$Y=C+M_1 \times X_1 + M_2 \times X_2 + M_3 \times X_3 + \ldots + M_n \times X_n$$

Let

Multi variable linear regression prediction function F (X)
Commonly accepted decision parameter=Y
Sensor 1 data=X1
Sensor 2 data=X2 . . .
Sensor N data or required gases output level=Xn Sensors 1 . . . . N can be the liquid content sensors, temperature sensors, liquid pressure sensors, gas pressure sensors, and gas flow sensors. In processing working temperature and working pressure, if the temperature and pressure are within an accepted range, then Xn is set to 1, otherwise it is set to 0.

Based on the value of decision parameter Y, control commands are sent to control the liquid flow valve and gas flow valves. The result is this machine learning model controls the flow of the liquid conversion solution from the liquid reservoir to the liquid flow distributor. Decision parameter Y is also used in a similar way to control gas flow valves to control gas out flow from the outlets of the gas chambers.

When training a machine learning model, more and more sensor data and the "commonly accepted decision parameters" are collected and fed into the model. The prediction function F is calculated and will become more and more accurate. The coefficients C, M1, M2, . . . . Mn will become more and more accurate. When the model is fully trained with enough training data, the model can be used (using function F, coefficient C, M1, M2, . . . . Mn) with new sensor data to predict future decision parameters.

This method of liquid-to-gas conversion utilizes artificial intelligence machine learning to control the liquid conversion solution flow. At the side of the electron exchangers facing the gas chambers, the liquid conversion solution is converted into final gases and directly released into the gas chambers. The power consumed by the conversion cell will be optimized.

This liquid-to-gas conversion method can be used to convert different kinds of liquid conversion solution into different kinds of gases, and this conversion method can also be used to convert liquid water to hydrogen and oxygen gases.

Multiple conversion cells 410 can be stacked vertically and horizontally (FIG. 3), and more conversion cells can be placed in the same physical space to achieve higher gas production level. Common components can be shared by multiple conversion cells.

Operation:

In the following example, we describe our method using water as liquid conversion solution to generate hydrogen and oxygen gases, but the principle of our method can be generalized to apply to other types of liquid conversion solutions to generate other types of gases. The following described embodiment is only one of the, but not all, embodiments of our presented method. Based on the embodiments of our presented method, all other embodiments obtained by those of ordinary skill in the art without creative efforts shall fall within the protection scope of our presented method.

The anode electron exchanger and cathode electron exchanger are placed in the liquid-to-gas conversion cell, and the conversion cell is separated into the cathode gas chamber, the liquid conversion solution chamber filled with the liquid flow distributor, and the anode gas chamber.

The surface of the electron exchanger is covered with puncture channels. The nonconductive side of the electron exchanger faces the liquid conversion solution chamber and it is in direct contact with the liquid flow distributor. The other conductive side of the electron exchanger faces the gas chamber. The liquid flow distributor is formed by stacking together multiple nonconductive flow distributor sheets. The surface of the flow distributor sheets is covered with multiple puncture channels.

Water is used as the liquid conversion solution and is stored in the liquid reservoir. Water is fed via the liquid flow valve into the liquid flow distributor inside the liquid conversion solution chamber. Potassium hydroxide is added to the water to ionize the liquid water molecules. By applying a voltage to the cathode and anode electron exchange, electrons are exchanged on the side of electron exchangers facing the gas chambers, and water is converted into hydrogen and oxygen gases releasing into the cathode gas chamber and the anode gas chamber.

The water in the liquid flow distributor is in contact with the anode electron exchanger and the cathode electron exchanger. Water molecules pass through the puncture channels of the cathode electron exchanger, and reach the conductive side of the cathode electron exchanger facing the cathode gas chamber. At this side, electrons from the cathode electron exchanger are released into the water to reduce the water to hydrogen and hydroxide root ion, and hydrogen gas is released into the cathode gas chamber. The hydroxide ions from the cathode electron exchanger flow through the liquid flow distributor, pass through the puncture channels of the anode electron exchanger, and reach the conductive side of the anode electron exchanger facing the anode gas chamber. At this side, the hydroxide ions are converted into water, oxygen and electrons. The electrons are collected by the anode electron exchanger, and the oxygen gas is released to the anode gas chamber.

The result is hydrogen and oxygen gases are collected separately from the two gas chambers. As more gas is produced, the water content in the liquid flow distributor goes down, and the microprocessor senses the low water content. After executing artificial intelligence calculations, the microprocessor opens the liquid flow valve, allowing more water from the liquid reservoir to flow to the liquid flow distributor. The result of our conversion method provides an energy efficient liquid-to-gas conversion method to generate hydrogen and oxygen gases from liquid water.

Conclusion, Ramifications, and Scope:

While the above description contains much specificity, these should not be construed as limitations on the scope of the invention, but rather as an exemplification of one preferred embodiment thereof. Many other variations are possible.

For example, we describe our method using an example of water as liquid conversion solution to generate hydrogen and oxygen gases, but the principle of our method can be generalized to apply to other types of liquid conversion solutions to generate other types of gases.

For example, we describe our method in manufacturing the puncture channels using precision technologies, comprising: chemical etching, plasma etching, laser drilling or electroforming. The puncture channels can possibly be manufactured by other kinds of technologies that are not listed in our described list of technologies, but the principle of our method can be generalized to apply to manufacturing the puncture channels with technologies that are able to create similar small openings.

For example, we describe our machine learning regression method by using a multi variable linear regression method as an illustration, but the principle of our regression method can be generalized to applying a combination of 1) single variable regression, 2) multi variable regression, 3) linear regression, and 4) nonlinear regression.

The described embodiment in the above description is only one of the, but not all, embodiments of our presented method. Based on the embodiments of our presented method, all other embodiments obtained by those of ordinary skill in the art without creative efforts shall fall within the protection scope of our presented method.

The scope of the invention should be determined not by the embodiments illustrated, but by the appended claims and their legal equivalents.

We claim:

1. A method for conversion of liquid to gas, comprising:
   placing a liquid flow distributor to fill a liquid conversion solution chamber inside a conversion cell;
   building said liquid flow distributor following design parameters by stacking two or more layers of nonconductive flow distributor sheets that comprise one or more puncture channels;
   feeding liquid conversion solution through a liquid inlet of said liquid flow distributor which spreads to the rest of said flow distributor sheets of said liquid flow distributor;
   utilizing said liquid flow distributor with said flow distributor sheets and said one or more puncture channels in distributing at a rate and an amount of said liquid conversion solution in spreading and retaining in said liquid flow distributor;

placing electron exchangers, built with one or more holes, in said conversion cell, comprising: a cathode electron exchanger, and an anode electron exchanger;

setting gas chambers in said conversion cell, comprising: a cathode gas chamber, and an anode gas chamber;

placing said cathode electron exchanger in between said liquid conversion solution chamber and said cathode gas chamber inside said conversion cell;

placing said anode electron exchanger in between said liquid conversion solution chamber and said anode gas chamber inside said conversion cell;

using said electron exchangers each built with one conductive side and one nonconductive side;

placing said nonconductive side of said cathode electron exchanger facing said liquid flow distributor in said liquid conversion solution chamber and in contact with said liquid flow distributor;

placing said nonconductive side of said anode electron exchanger facing said liquid flow distributor in said liquid conversion solution chamber and in contact with said liquid flow distributor;

placing said conductive side of said cathode electron exchanger facing said cathode gas chamber;

placing said conductive side of said anode electron exchanger facing said anode gas chamber;

applying a voltage to said anode electron exchanger and said cathode electron exchanger; and converting said liquid conversion solution into gases releasing to said gas chambers in said conversion cell.

2. The method of claim 1 wherein said converting said liquid conversion solution into said gases in said conversion cell further comprises:

utilizing said conversion cell in converting one or more kinds of said liquid conversion solution into one or more kinds of said gases;

stacking two or more cells of said conversion cell vertically and horizontally; and sharing common components among said two or more cells of said conversion cell.

3. The method of claim 1 wherein said building and said utilizing said liquid flow distributor further comprise:

releasing said liquid conversion solution from said liquid flow distributor to said electron exchangers and passing said liquid conversion solution through said one or more holes of said electron exchangers to said conductive side of said anode electron exchanger and to said conductive side of said cathode electron exchanger; and exchanging electrons with said liquid conversion solution on said conductive side of said anode electron exchanger and said conductive side of said cathode electron exchanger.

4. The method of claim 3 wherein said releasing said liquid conversion solution from said liquid flow distributor, further comprises:

building and stacking said flow distributor sheets with one or more said puncture channels following said design parameters to form said liquid flow distributor for distributing at a rate and efficiency of said conversion of said liquid conversion solution into said gases; and utilizing said flow distributor sheets with said one or more said puncture channels to distribute at a rate and an amount of said liquid conversion solution releasing to said electron exchangers from said liquid flow distributor.

5. The method of claim 4 wherein said building and said stacking of said flow distributor sheets, further comprise:

following said design parameters in setting inter-sheet adjacent pair of said one or more puncture channels from adjacent said flow distributor sheets to be out of alignment with each other, and forming a pattern of interlocking said one or more puncture channels in between said adjacent said flow distributor sheets.

6. The method of claim 4 wherein said building said flow distributor sheets with said one or more puncture channels following said design parameters, further comprises:

following said design parameters in making said one or more puncture channels wherein said design parameters comprise one or more design patterns; and said design patterns help to enhance said liquid conversion solution adhering to said flow distributor sheets.

7. The method of claim 4 wherein said building said flow control-distributor sheets further comprises:

manufacturing said one or more puncture channels with technologies that comprise one or more of the following:

chemical etching by applying chemicals to etch away specific points of material to form said one or more puncture channels;

plasma etching by applying plasma to etch away specific points of material to form said one or more puncture channels;

laser drilling by repeatedly applying a pulsing focused laser to material to cut away specific spots to form said one or more puncture channels; and electroforming by electro depositing of material onto a mandrel to form said one or more puncture channels.

8. The method of claim 4 wherein said building said flow distributor sheets following said design parameters, further comprises:

modeling said liquid conversion solution, due to said surface tension, adhering on said surfaces of said flow distributor sheets as said one or more droplets and diffusing until a partial wetting equilibrium contact radius is reached;

expressing radius r of an adhering droplet of said one or more droplets on an adhered surface of said flow distributor sheets as:

$$r = \sqrt{\frac{V}{\pi h}}, \text{ where } h = \sqrt{\frac{2\sigma(1-\cos\theta)}{\rho g}};$$

σ is said surface tension;
g is the gravitational acceleration constant;
θ is the contact angle between said adhering droplet and said adhered surface;
h is the height of said adhering droplet;
V is the volume of said adhering droplet;

expressing said adhering droplet with said radius over time r(t) as:

$$r(t) = r_e \left[1 - \exp\left(-\left(\frac{2\gamma_{LG}}{r_e^{12}} + \frac{\rho g}{9 r_e^{10}}\right)\frac{24\lambda V^4(t+t_0)}{\pi^2 \eta}\right)\right]^{\frac{1}{6}};$$

expressing said adhering droplet with radius in perfect spread over time rp(t), which is the radius of said adhering droplet by assuming a perfect spreading of said adhering droplet and a delay time, as:

$$\left[\left(\gamma_{LG}\frac{96\lambda V^4}{\pi^2\eta}(t+t_0)^{\frac{1}{2}}+\left(\frac{\lambda(t+t_0)}{\eta}\right)^{\frac{2}{3}}\frac{24\rho g V^{\frac{3}{8}}}{7\cdot96^{\frac{1}{3}}\pi^{\frac{4}{3}}\gamma_{LG}^{\frac{1}{3}}}\right)\right]^{\frac{1}{6}};$$

γ is the coefficient of said surface tension;

γLG is the term factor of said surface tension;

η is the viscosity of said liquid conversion solution;

ρ is the density of said liquid conversion solution;

λ is the shape factor of said adhering droplet;

$t_0$ is the experimental delay time;

$r_e$ is the radius of said adhering droplet at equilibrium;

making distances between identifiable adjacent pair of said one or more puncture channels as a multiple of said radius over time r(t) or said radius in perfect spread over time rp(t);

making radii of said one or more puncture channels no bigger than said radius over time r(t) or said radius in perfect spread over time rp(t); and adjusting said distances between said identifiable adjacent pair of said one or more puncture channels to different values depending on locations of said one or more puncture channels on said flow distributor sheets.

9. The method of claim 8 wherein said making radii of said one or more puncture channels, further comprises:

expressing height d of a column of said liquid conversion solution inside a containing puncture channel of said one or more puncture channels as:

$$d=\frac{2\gamma\cos x}{\rho g r(t)};$$

x is the contact angle between said liquid conversion solution of said column and contact surface inside said containing puncture channel;

making thickness of said one or more puncture channels of said flow distributor sheets no thicker than said height d; and making spacing between adjacent said flow distributor sheets be a multiple of said height d.

10. A method for conversion of liquid to gases, comprising:

placing a liquid flow distributor to help-fill a liquid conversion solution chamber inside a conversion cell;

feeding said liquid conversion solution through a liquid inlet of said liquid flow distributor;

placing electron exchangers in said conversion cell, comprising: a cathode electron exchanger, and anode electron exchanger;

setting gas chambers in said conversion cell, comprising: a cathode gas chamber, and an anode gas chamber;

placing said cathode electron exchanger in between said liquid conversion solution chamber and said cathode gas chamber inside said conversion cell;

placing said anode electron exchanger in between said liquid conversion solution chamber and said anode gas chamber inside said conversion cell;

applying a voltage to said anode electron exchanger and said cathode electron exchanger;

converting said liquid conversion solution into gases releasing to said gas chambers in said conversion cell; and controlling said conversion cell by using a computing engine, built with one or more computing devices connected with a computer network, to perform one or more artificial intelligence calculations.

11. The method of claim 10 wherein said converting said liquid conversion solution into said gases further comprises:

building said liquid flow distributor following design parameters by stacking two or more layers of nonconductive flow distributor sheets that comprise one or more puncture channels;

using said electron exchangers covered with one or more holes;

using said electron exchangers each built with one conductive side and one nonconductive side;

placing said nonconductive side of said cathode electron exchanger facing said liquid flow distributor in said liquid conversion solution chamber and in contact with said liquid flow distributor;

placing said nonconductive side of said anode electron exchanger facing said liquid flow distributor in said liquid conversion solution chamber and in contact with said liquid flow distributor;

placing said conductive side of said cathode electron exchanger facing said cathode gas chamber; and placing said conductive side of said anode electron exchanger facing said anode gas chamber.

12. The method of claim 10 wherein said controlling said conversion cell further comprises:

placing field devices at one or more control locations inside or outside said conversion cell;

performing said one or more artificial intelligence calculations to exchange data with said field devices connected through a data network and to control said field devices; and performing said one or more artificial intelligence calculations to help adjusting physical parameters at said one or more control locations.

13. The method of claim 12 wherein said adjusting said physical parameters further comprises:

adjusting temperature, as part of said physical parameters, at said one or more control locations.

14. The method of claim 12 wherein said performing said one or more artificial intelligence calculations further comprises:

performing said one or more artificial intelligence calculations that comprise one or more of the following: single variable equations, multiple variable equations, linear equations, nonlinear equations, regression analysis, neural network analysis, and foundation model analysis;

expressing predictive function F (X) for said one or more artificial intelligence calculations to accept input data to predict decision parameter used for adjusting said physical parameters or for controlling said field devices as:

Y=F(X1,X2, . . . ,Xn);

Y is said decision parameter;

X1 through Xn-1 are said input data from field device 1 through field device N-1 of said field devices;

Xn is target required gas output level of said conversion cell; and evaluating said decision parameter Y to determine commands to send to adjust said physical parameters or to control said field devices.

15. The method of claim 12 wherein said adjusting said physical parameters further comprises:

adjusting liquid flow rate, as part of said physical parameters, at said one or more control locations.

16. The method of claim 12 wherein said adjusting said physical parameters further comprises:
   adjusting gas flow rate, as part of said physical parameters, at said one or more control locations.

17. The method of claim 12 wherein said placing said field devices further comprises:
   placing gas flow valves, as part of said field devices, at said one or more control locations.

18. The method of claim 12 wherein said placing said field devices further comprises:
   placing liquid flow valves, as part of said field devices, at said one or more control locations.

19. The method of claim 12 wherein said adjusting said physical parameters further comprises:
   adjusting liquid pressure, as part of said physical parameters, at said one or more control locations.

20. The method of claim 12 wherein said adjusting said physical parameters further comprises:
   adjusting gas pressure, as part of said physical parameters, at said one or more control locations.

21. The method of claim 12 wherein said placing said field devices further comprises:
   placing one or more of the following: liquid pressure sensors, gas pressure sensors, gas flow sensors, liquid content sensors, and temperature sensors, as part of said field devices, at said one or more control locations.

* * * * *